United States Patent
Konkle et al.

(10) Patent No.: US 8,563,938 B2
(45) Date of Patent: Oct. 22, 2013

(54) DETECTOR ASSEMBLY OF A DIGITAL X-RAY DETECTOR

(75) Inventors: Nicholas Ryan Konkle, Waukesha, WI (US); Gary Vernon McBroom, Dousman, WI (US)

(73) Assignee: General Electric Company, Schenectady, NY (US)

( * ) Notice: Subject to any disclaimer, the term of this patent is extended or adjusted under 35 U.S.C. 154(b) by 915 days.

(21) Appl. No.: 12/630,572

(22) Filed: Dec. 3, 2009

(65) Prior Publication Data

US 2011/0133085 A1 Jun. 9, 2011

(51) Int. Cl.
*G01T 1/00* (2006.01)

(52) U.S. Cl.
USPC .................................................. 250/370.09

(58) Field of Classification Search
USPC ......................................... 250/370.09
See application file for complete search history.

(56) References Cited

U.S. PATENT DOCUMENTS

| | | | |
|---|---|---|---|
| 5,198,685 A | 3/1993 | Kitani et al. | |
| 5,796,109 A | 8/1998 | Frederick et al. | |
| 5,804,832 A | 9/1998 | Crowell et al. | |
| 5,973,327 A * | 10/1999 | Moy et al. | 250/370.09 |
| 6,025,598 A | 2/2000 | Tago | |
| 6,548,177 B2 | 4/2003 | Hieda et al. | |
| 6,548,815 B1 * | 4/2003 | Umazaki | 250/370.09 |
| 6,700,126 B2 | 3/2004 | Watanabe | |
| 6,825,472 B2 | 11/2004 | Endo | |
| 7,488,946 B2 | 2/2009 | Hennessy et al. | |
| 7,495,226 B2 | 2/2009 | Jadrich et al. | |
| 7,495,227 B2 | 2/2009 | Hennessy et al. | |
| 2004/0200880 A1 * | 10/2004 | Van Den Broek et al. | 228/103 |
| 2008/0078940 A1 | 4/2008 | Castleberry et al. | |
| 2009/0224161 A1 * | 9/2009 | Fritsch et al. | 250/370.09 |
| 2010/0264572 A1 | 10/2010 | Konkle | |

FOREIGN PATENT DOCUMENTS

WO  WO 2007003571 A1 *  1/2007

OTHER PUBLICATIONS

U.S. Appl. No. 12/630,524, filed Dec. 3, 2009, Konkle.

* cited by examiner

*Primary Examiner* — David Porta
*Assistant Examiner* — Shun Lee
(74) *Attorney, Agent, or Firm* — Fletcher Yoder, P.C.

(57) ABSTRACT

In one embodiment, a digital X-ray detector assembly is provided that includes a digital detector array and a support panel secured to the detector array, wherein at least one side of the support panel includes a recess exposing an edge region of the detector array. In another embodiment, a method is provided for assembling a digital X-ray detector assembly. The method includes securing a rear side of a detector array to a front side of a support panel that includes a recess in at least one side of the support panel, wherein the recess of the support panel exposes an edge region of the detector array; and processing the exposed edge region of the detector array. In a further embodiment, a method is provided for assembly and servicing of a digital X-ray detector assembly.

17 Claims, 8 Drawing Sheets

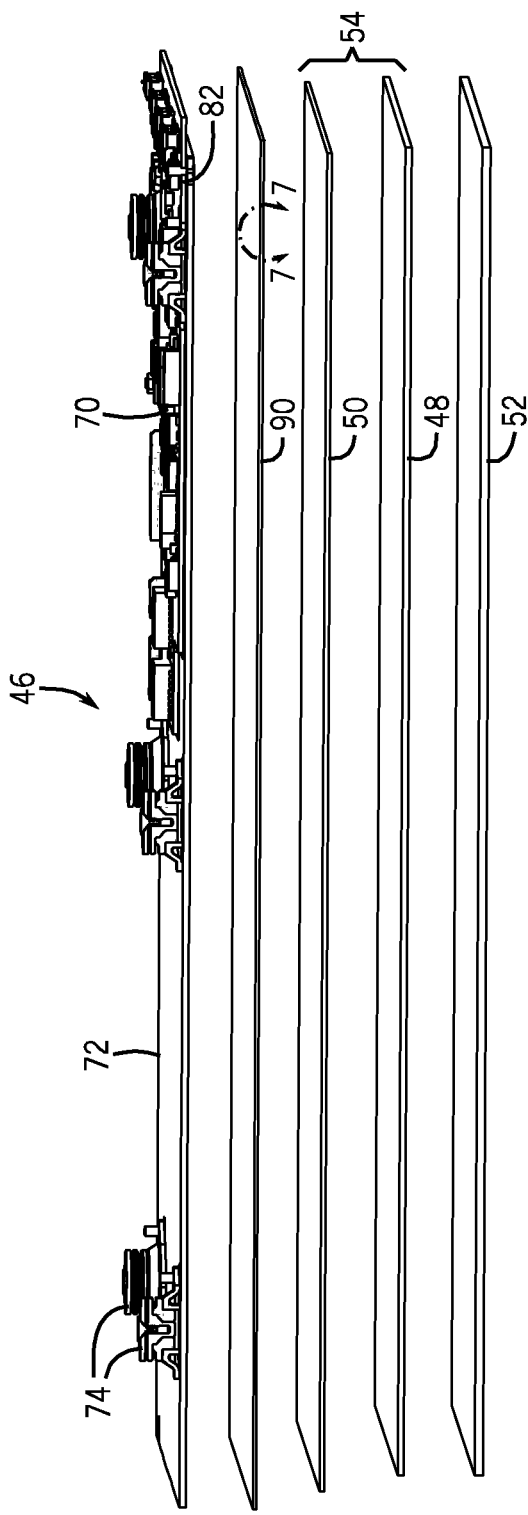

DETECTOR ASSEMBLY OF A DIGITAL X-RAY DETECTOR

BACKGROUND OF THE INVENTION

The present invention relates to digital imaging systems, and particularly to the assembly of components of a digital X-ray detector of such systems.

A number of radiological imaging systems of various designs are known and are presently in use. Such systems generally are based upon generation of X-rays that are directed toward a subject of interest. The X-rays traverse the subject and impact a film or a digital detector. In medical diagnostic contexts, for example, such systems may be used to visualize internal tissues and diagnose patient ailments. In other contexts, parts, baggage, parcels, and other subjects may be imaged to assess their contents and for other purposes.

Increasingly, such X-ray systems use digital circuitry, such as solid-state detectors, for detecting the X-rays, which are attenuated, scattered or absorbed by the intervening structures of the subject. Solid-state detectors may generate electrical signals indicative of the intensities of received X-rays. These signals, in turn, may be acquired and processed to reconstruct images of the subject of interest.

As digital X-ray imaging systems have become increasingly widespread, digital X-ray detectors have become more portable for even greater versatility. With the advent of portable digital X-ray detectors comes a need for lighter, thinner, smaller detectors that retain the same imager size but improve upon the ergonomics and durability of the detector. Also, a need exists to protect the fragile detector assembly within the portable detector. Improving upon the design of the detector assembly is necessary to make the detector assembly sturdier and easier to service while reducing the costs of assembling detectors.

BRIEF DESCRIPTION OF THE INVENTION

In accordance with one embodiment, a digital X-ray detector assembly is provided that includes a digital detector array and a support panel secured to the detector array, wherein at least one side of the support panel includes a recess exposing an edge region of the detector array.

In accordance with another embodiment, a method is provided for assembling a digital X-ray detector assembly. The method includes securing a rear side of a detector array to a front side of a support panel that includes a recess in at least one side of the support panel, wherein the recess of the support panel exposes an edge region of the detector array; and processing the exposed edge region of the detector array.

In accordance with a further embodiment, a method is provided for assembly and servicing of a digital X-ray detector assembly. The method provides for assembling a detector assembly that includes a digital detector array, a support panel with a front side secured to a rear side of the detector array, wherein at least one side of the support panel includes a recess exposing an edge region of the detector array, and an electronic module interfaced with the digital detector array via conductors secured to the exposed edge region of the detector array. The method also provides for removing at least one of the conductors from the exposed edge region of the detector array without removing the support panel from the detector array and re-securing the same or another conductor to the exposed edge region of the detector array without removing the support panel from the detector array.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is an exploded longitudinal cross-sectional view of a detector panel assembly in accordance with certain embodiments of the present technique;

FIG. 7 is a detail view of the reflected light absorption layer, as shown in FIG. 6, in accordance with certain embodiments of the present technique;

DETAILED DESCRIPTION OF THE INVENTION

Figure 1:
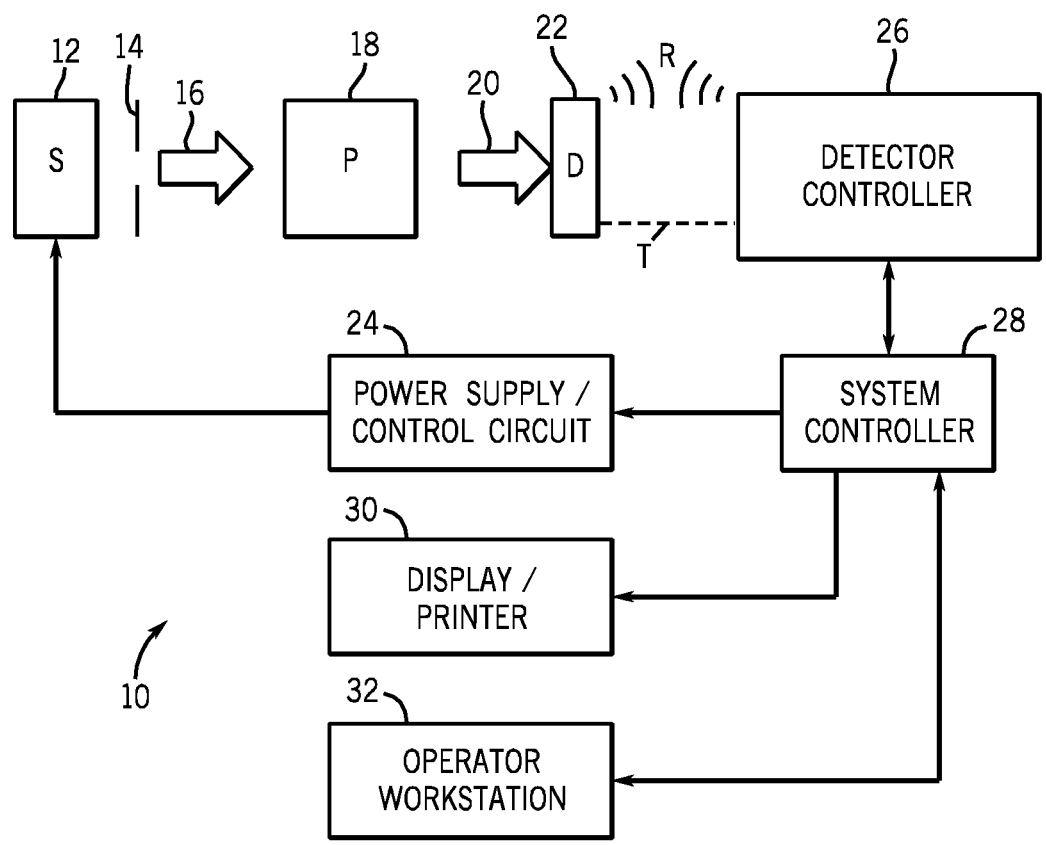
FIG. 1 is a diagrammatical overview of a digital X-ray imaging system of one embodiment in which the present technique may be utilized.

Turning now to the drawings, FIG. 1 illustrates diagrammatically an imaging system 10 for acquiring and processing discrete pixel image data. In the illustrated embodiment, imaging system 10 is a digital X-ray system designed both to acquire original image data and to process the image data for display in accordance with the present technique. In the embodiment illustrated in FIG. 1, imaging system 10 includes a source of X-ray radiation 12 positioned adjacent to a collimator 14. The collimator 14 permits a stream of radiation 16 to pass into a region in which an object or subject, such as a patient 18, is positioned. A portion of the radiation 20 passes through or around the subject and impacts a digital X-ray detector, represented generally at reference numeral 22. As will be appreciated by those skilled in the art, the detector 22 may convert the X-ray photons received on its surface to lower energy photons, and subsequently to electric signals, which are acquired and processed to reconstruct an image of the features within the subject.

The radiation source 12 is controlled by a power supply/control circuit 24 which supplies both power and control signals for examination sequences. Moreover, the detector 22 is communicatively coupled to a detector controller 26 which commands acquisition of the signals generated in the detector 22. In the presently illustrated embodiment, the detector 22 may communicate with the detector controller 26 via any suitable wireless communication standard, although the use of detectors 22 that communicate with the detector controller 26 through a cable or some other mechanical connection are also envisaged. The detector controller 26 may also execute various signal processing and filtration functions, such as for initial adjustment of dynamic ranges, interleaving of digital image data, and so forth.

Both the power supply/control circuit 24 and the detector controller 26 are responsive to signals from a system controller 28. In general, the system controller 28 commands operation of the imaging system to execute examination protocols and to process acquired image data. In the present context, the system controller 28 also includes signal processing circuitry, typically based upon a programmed general purpose or application-specific digital computer; and associated manufactures, such as optical memory devices, magnetic memory devices, or solid-state memory devices, for storing programs and routines executed by a processor of the computer to carry out various functionalities, as well as for storing configuration parameters and image data; interface circuits; and so forth.

In the embodiment illustrated in FIG. 1, the system controller 28 is linked to at least one output device, such as a display or printer as indicated at reference numeral 30. The output device may include standard or special purpose computer monitors and associated processing circuitry. One or more operator workstations 32 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

Figure 2:
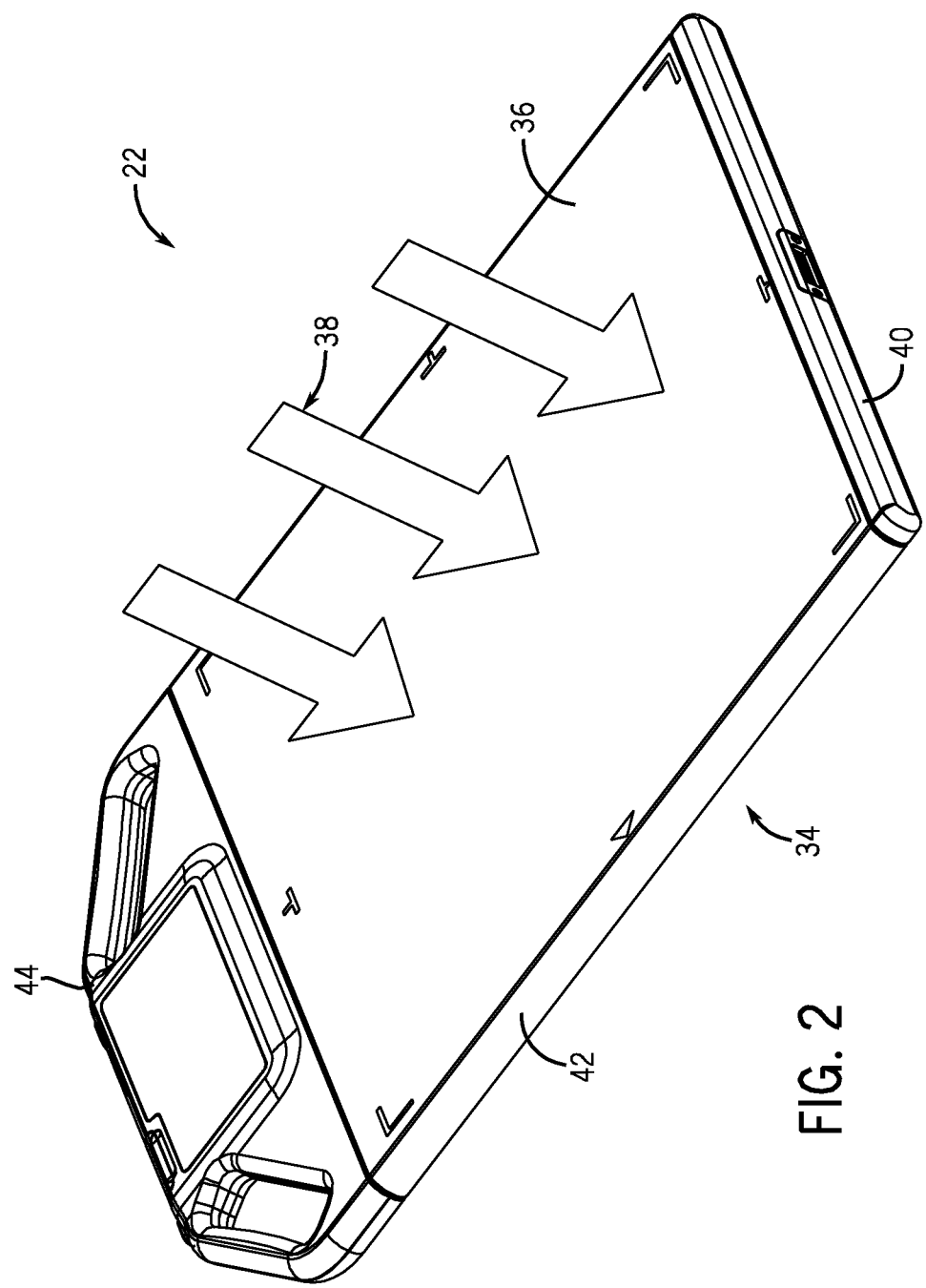
FIG. 2 is a front perspective view of a portable digital X-ray detector in accordance with an embodiment of the present technique.

The exemplary imaging system 10, and other imaging systems based on radiation detection, employs a detector 22, such as a flat panel, digital X-ray detector. A perspective view of such an exemplary flat panel, digital X-ray detector 22 is provided in FIG. 2. The exemplary flat panel, digital X-ray detector 22 includes a detector subsystem for generating electrical signals in response to reception of incident X-rays. In accordance with certain embodiments, a shell assembly 34 provides an external enclosure surrounding the detector panel assembly, so as to protect the fragile detector components from damage when exposed to an external load or an impact. In addition, as discussed in further detail below, the detector 22 may include shock absorbent structures to protect the internal components within the shell assembly 34. In one embodiment, the shell assembly 34 may be a single-piece continuous structure and may be substantially devoid of any discontinuities. For example, the single-piece shell assembly 34 may be a 4-5 sided structure in a sleeve like configuration having at least one opening to allow for insertion of the detector panel assembly. The shell assembly 34 includes a front side 36 to receive radiation 38. It should be noted that the individual sides or edges of the single-piece sleeve may be flat, rounded, curved, contoured, or shaped to improve detector ruggedness and ease of use. Alternatively, the shell assembly 34 may be a multi-piece assembly. The shell assembly 34 may be formed of materials such as a metal, a metal alloy, a plastic, a composite material, or a combination of the above. In certain embodiments, the material has low X-ray attenuation characteristics. In one embodiment, the shell assembly 34 may be formed of a lightweight, durable composite material such as a carbon fiber reinforced plastic material, carbon reinforced plastic material in combination with foam cores, or a graphite fiber-epoxy composite. Some embodiments may include one or more material compositions having a non-conductive matrix with conductive elements disposed therein, and may provide electromagnetic interference shielding to protect the internal components of the detector 22 from external electronic noise. Additionally, the shell assembly 34 may be designed to be substantially rigid with minimal deflection when subjected to an external load.

In certain embodiments, an end cap 40 may be provided at one end of a sleeve or shell 42 to form the shell assembly 34. It should be noted that the end cap 36 may be formed of an impact resistant, energy absorbent material such as nylon, polyethylene, ultra high molecular weight polyethylene (UHMW-PE), delrin, or polycarbonate. UHMW polyethylene is a linear polymer with a molecular weight generally in the range of about 3,100,000 to about 6,000,000. Further, a handle 44 may be mechanically coupled to the shell assembly 34 to facilitate the portability of the detector 22. This handle 44 may be a separate component, which is attached to the shell assembly 34. Again, it should be noted that the handle 44 may be formed of an impact resistant, energy absorbent material such as a high molecular weight polyethylene. The handle 44 may, in turn, include various features that facilitate handling of the detector 22 by a technician or other user. In some embodiments, such as that depicted in FIG. 2, the handle 44 may include one or more grips, although it is noted that other features, such as contours allowing a user to more easily grip the detector 22, may also or instead be included in other embodiments.

As shown, the detector 22 may be constructed without a fixed tether or cable. Alternatively, the detector 22 may be connected to a tether that is used to connect the detector readout electronics to the data acquisition system of the scanner when in use. When not in use, the detector 22 may be easily detached from tether and stored remotely from the imaging system. As such, detector 22 may be transported to and from multiple scan stations remote from one another. This is particularly advantageous for emergency rooms and other triage facilities.

Figure 3:
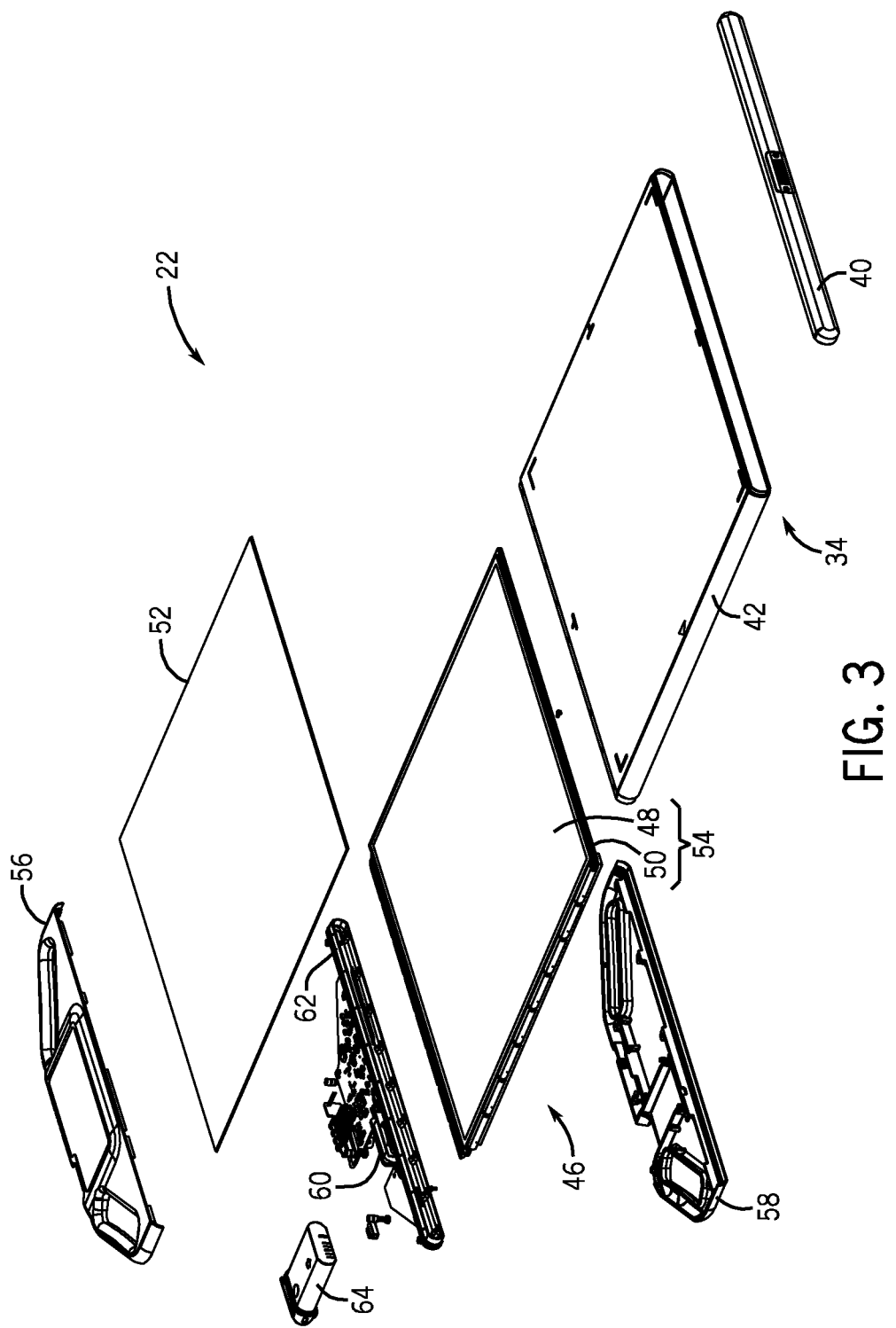
FIG. 3 is an exploded front perspective view of the portable digital X-ray detector, as shown in FIG. 2, in accordance with certain embodiments of the present technique.
Figure 4:
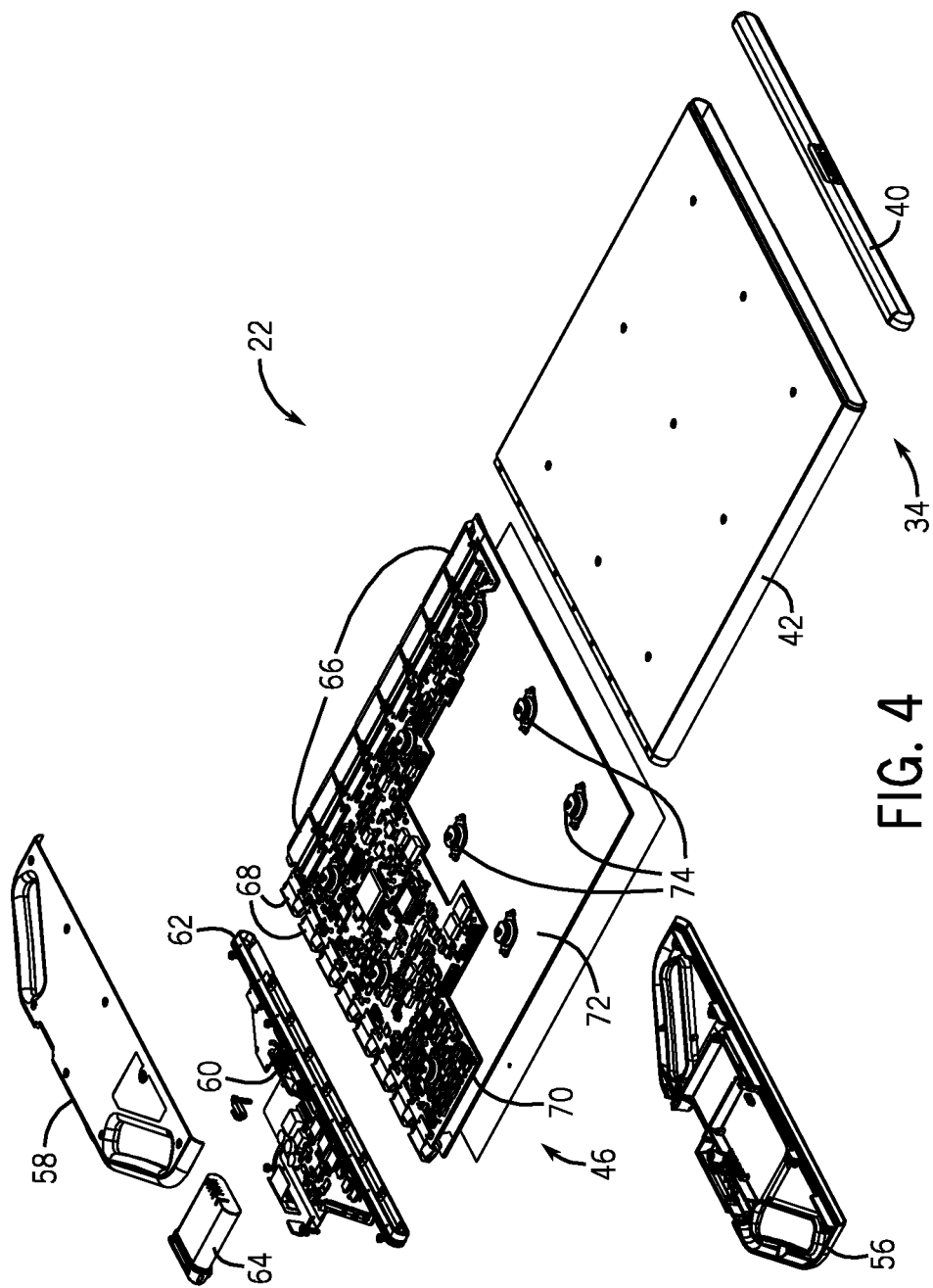
FIG. 4 is an exploded rear perspective view of the portable digital X-ray detector, as shown in FIG. 2, in accordance with certain embodiments of the present technique.

FIGS. 3-4 illustrate the digital detector panel assembly 46 of the portable flat panel digital X-ray detector 22 removed from the shell assembly 34. The illustrated detector panel assembly 46 of FIG. 3 includes an imaging panel 48, detector panel 50, and front shock absorbing structure 52. Together, imaging panel 48 and detector panel 50 comprise a detector array 54. The imaging panel 48 includes a scintillator layer for converting incident X-rays to visible light. The scintillator layer, which may be fabricated from cesium iodide (CsI) or other scintillating materials, is designed to emit light proportional to the energy and the amount of the X-rays absorbed. As such, light emissions will be higher in those regions of the scintillator layer where either more X-rays were received or the energy level of the received X-rays was higher. Since the composition of the subject will attenuate the X-rays projected by the X-ray source to varying degrees, the energy level and the amount of the X-rays impinging upon the scintillator layer will not be uniform across the scintillator layer. This variation in light emission will be used to generate contrast in the reconstructed image.

The light emitted by the scintillator layer is detected by a photosensitive layer on the detector panel 50. The photosensitive layer includes an array of photosensitive elements or detector elements to store an electrical charge in proportion to the quantity of incident light absorbed by the respective detector elements. Generally, each detector element has a light sensitive region and a region including electronics to control the storage and output of electrical charge from that detector element. The light sensitive region may be composed of a photodiode, which absorbs light and subsequently creates and stores electronic charge. After exposure, the electrical charge in each detector element is read out using logic-controlled electronics 66 (shown in FIG. 4).

Each detector element is generally controlled using a transistor-based switch. In this regard, the source of the transistor is connected to the photodiode, the drain of the transistor is connected to a readout line, and the gate of the transistor is connected to a scan control interface 68 disposed on the electronics 70 in the detector 22 (shown in FIG. 4). When negative voltage is applied to the gate, the switch is driven to an OFF state, thereby preventing conduction between the source and the drain. Conversely, when a positive voltage is applied to the gate, the switch is turned ON, thereby allowing the photodiode to be recharged, with the amount of charge being a function of the diode depletion as an indication of incident energy, which is detected on the readout line. Each detector element of the detector array 54 is constructed with a respective transistor (e.g., a thin-film transistor).

Specifically during exposure to X-rays, negative voltage is applied to all gate lines resulting in all the transistor switches being driven to or placed in an OFF state. As a result, any charge depletion experienced during exposure reduces the charge of each detector element. During read out, positive voltage is sequentially applied to each gate lines. That is, the detector is an X-Y matrix of detector elements and all of the gates of the transistors in a line are connected together so that turning ON one gate line simultaneously reads out all the detector elements in that line. A multiplexer may also be used to support read out of the detector elements in a faster fashion. The output of each detector element is then input to an output circuit (e.g., a digitizer) that digitizes the acquired signals for subsequent image reconstruction on a per pixel basis. In a typical reconstruction, each pixel of the reconstructed image corresponds to a single detector element of the detector array 54.

In certain embodiments, a front shock absorbing structure 52 may be disposed between the detector panel assembly 46 and the inner surface of shell assembly 34. The front shock absorbing structure 52 may include multiple layers of different materials, different geometries (e.g., rectangular, circular, triangular, etc.), different dimensions (e.g., length, width, thickness, etc.), or combination thereof. The front shock absorbing structure 52 may be in contact with both the detector panel assembly 46 and the shell assembly 34. In this manner, the front shock absorbing structure 52 may act both as a positional support and shock absorber for the detector panel assembly 46. In certain embodiments, the front shock absorbing structure 52 may include a rubber, a foam, an elastomer, a foam rubber, another elastic material, or a combination thereof. For example, the front shock absorbing structure 52 may include fine-celled, low compression-set, high density polyurethane foams and/or a high density, flexible, microcellular urethane foam materials. Although these foams are described as high density, the front shock absorbing structure 52 is generally low density as compared with other materials. In some embodiments, the front shock absorbing structure 52 may include CONFOR foam and/or ISOLOSS foam manufactured by E-A-R Specialty Composites, a business unit of Aearo Technologies, Indianapolis, Ind. In other embodiments, the front shock absorbing structure 52 may include PORON foam manufactured by Rogers Corporation, Rogers Conn. The front shock absorbing structure 52 generally has a high impact resistance or energy-absorption characteristic, such as 50, 60, 70, 80, or 90 percent absorption of an impact. In some embodiments, the energy-absorption of the front shock absorbent structure 52 may be about 96, 96, 97, 98, or 99 percent of an impact. These foams are also generally lightweight, and may include a single-sided adhesive layer on a back side of the foam layer to secure the front shock absorbing structure 52 to a front side of the detector array 54 of the detector panel assembly 46. These foams may also include a single-sided friction reducing layer on a front side of the foam layer contacting an inner surface of the shell assembly 34 to facilitate placement of the detector panel assembly 46 in the shell assembly 34. The friction reducing layer may be formed of ultra high molecular weight polyethylene.

FIG. 3 further illustrates some components of the handle 44 of the portable digital X-ray detector 22. The handle 44 includes a handle top 56, a handle bottom 58, power connector 60, and handle interface 62. Operating power may be provided to the digital detector 22 via the power connector 60 configured to engage either of a removable battery 64 or a cable (e.g., a tether). In one embodiment, the connector 60 may generally include a receptacle for receiving either the removable battery 64 or the tether and may include electrical contacts to route power from the battery or from an external power source via the tether to the various components of the digital detector 22. The handle interface 62 may be configured to be electrically coupled to a conductor of an electrical cord at a common electrical potential.

The internal electronics of the digital detector 22 may be susceptible to interference from external electronic devices, and such external devices may also be affected by the electronic noise generated by the internal electronics of the digital detector 22. Further, in some embodiments, the entire shell assembly 34 may form an electrically conductive, single piece shell around the detector array 54 to shield the internal components from electromagnetic interference. In certain embodiments, the handle interface 62 may cover an upper open end of the shell 42 and form a first conductive end cap 62 of the shell assembly 34 and a second conductive end cap 40 may cover the lower open end of the shell 42. The conductive end cap 40 may be coated internally with a composite material to make the end cap 40 electrically conductive. The internal coat may consist of copper, nickel, and/or other conductive metals.

FIG. 4 illustrates a rear perspective view of the flat panel, digital X-ray detector 22 in FIG. 3. The detector panel assembly 46 further includes a support panel 72, electronics 70, and a rear shock absorbing structure. The support panel 72 provides support to the detector array 54, electronics 70, and rear shock absorbing structure. The electronics 70 including data modules 66 and scan modules 68, as well as the rear shock absorbing structure, are secured on a rear side of the support panel 72. A rear side of the detector array 54 is secured to a front side of the support panel 72. That is, the support panel 72 mechanically isolates the imaging components of the detector array 54 from the electronics 70.

Generally, the support panel 72 may be formed of a metal, a metal alloy, a plastic, a composite material, or a combination of the above material. In one embodiment, the support panel 72 may be substantially formed of a carbon fiber reinforced plastic material or a graphite fiber-epoxy composite. In another embodiment, the support panel 72 may be substantially formed of composite materials in combination with a foam core in a laminated sandwich construction so as to provide a lightweight yet stiff assembly to serve as the support panel 72. The construction of the support panel 72 from the composite materials alone or composite materials in combination with foam cores reduces weight while providing greater mechanical stiffness and improved energy absorption capability. For example, one embodiment of the support panel 72 includes a graphite fiber-epoxy composite with foam core.

The composite materials are typically combinations of a reinforcement and a matrix. The matrix material, such as a resin or epoxy, surrounds and supports the reinforcement material. The reinforcement materials, such as an organic or inorganic fibers or particles, are bound together by the composite matrix. For fiber reinforcements, the direction the individual fibers may be oriented to control the rigidity and the strength of the composite. Further, composite may be formed of several individual layers with the orientation or alignment of the reinforcement layers varying through the thickness of composite. The construction may be a laminate type construction (containing layers of reinforcements only) or a sandwich type construction (where a soft core is inserted between the two sets of reinforcement layers). The resins used could be thermosets or thermoplastics. In sandwich type construction, the soft core can result in additional weight reduction and could have metal or non-metallic pins to enhance energy absorption capability. Also, the layers of the composite could use multiple materials (carbon, Kevlar, aluminum foil etc.) in different forms (particles, fibers, fabric, thin foils etc.). In one embodiment, the composite material for the digital X-ray detector 22 may be configured from carbon fibers or epoxy resins in layered construction with a foam core.

For example, in one embodiment, the rear shock absorbing structure may include a shock mount assembly that includes a plurality of shock absorbing mounts 74 configured to prevent the electronics 70 and detector array 54 from contacting the shell assembly 34, as described in greater detail in co-pending U.S. patent application Ser. No. 12/426,416, filed Apr. 20, 2009, and entitled "Shock Mount Assembly and Detector Including the Same," which is hereby incorporated by reference in its entirety. As shown in FIG. 4, in some embodiments, the shock absorbing mounts 74 are arranged in three rows and three columns. Optionally, more or fewer shock absorbing mounts 74 may be arranged in four rows and three columns, e.g. twelve shock absorbing mounts 74, or four rows and four columns, e.g. sixteen shock absorbing mounts 74, etc.

Figure 5:
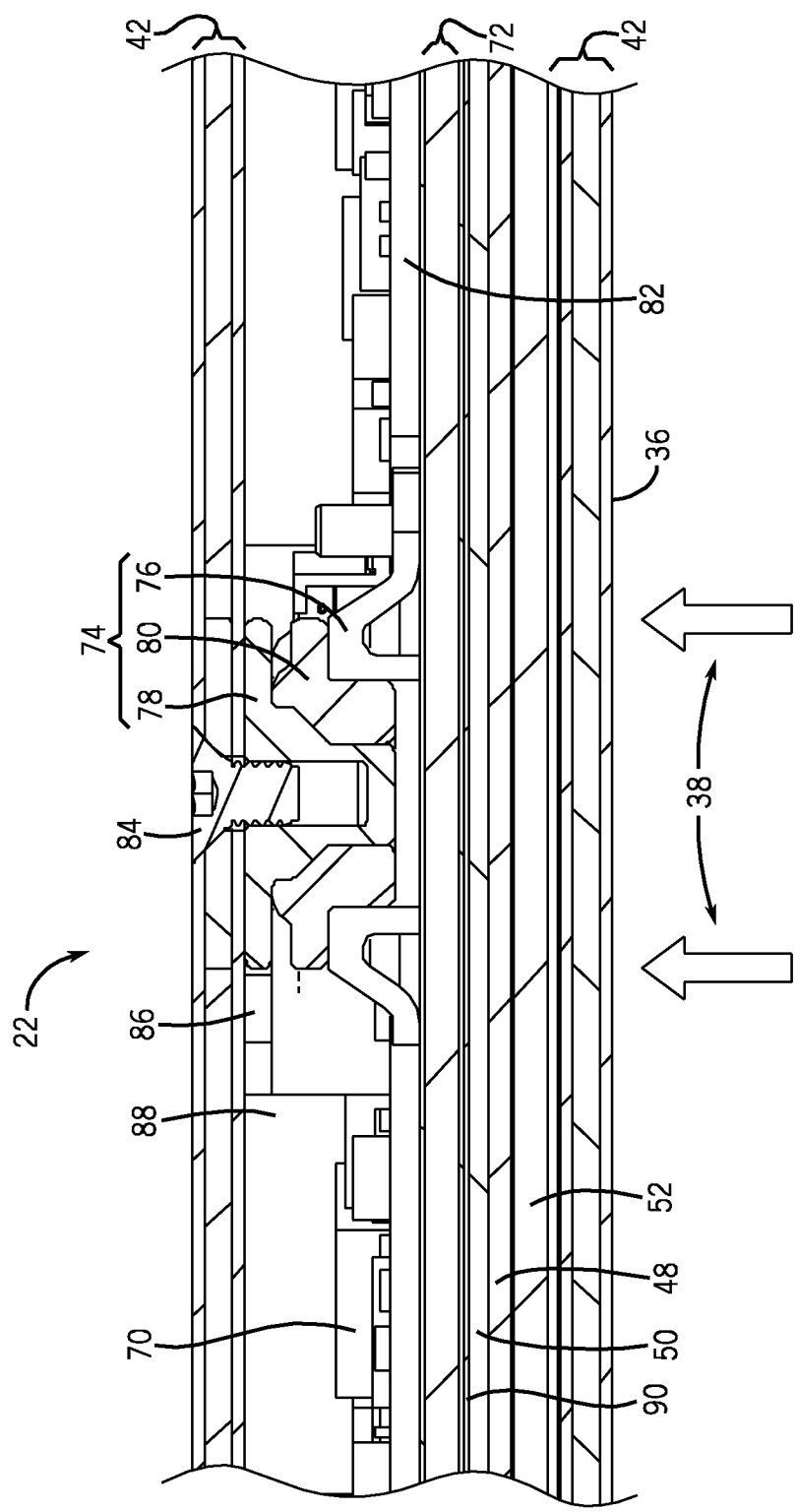
FIG. 5 is a transverse cross-sectional view of the portable digital X-ray detector, as shown in FIG. 2, in accordance with certain embodiments of the present technique.

FIG. 5 illustrates a transverse cross-sectional view of a portable digital X-ray detector. In certain embodiments, the shock absorbing mount 74 includes a base member 76, a top member 78, and an isolator member 80 where at least a portion of the isolator member 80 is disposed between the base member 76 and the top member 78. Each shock absorbing mount 74 is mounted between the shell assembly 34 and the support panel 72 and has a dynamic stiffness that is selected to provide a dynamic stiffness in three different directions to limit the movement, deflection, and/or acceleration of the electronics 70 and detector array 54 with respect to the shell assembly 34 surrounding the detector panel assembly 46 in three dimensions. More specifically, a circuit board 82 with the electronics 70 disposed thereon includes at least one opening extending therethrough that is sized to enable at a least a portion of the shock absorbing mount 74 to be disposed proximate to and therefore directly secured to the support panel 72. The base member 76 of the shock absorbing mount 74 is coupled to a rear side of the support panel 72. The support panel 72 may include two studs that are inserted through respective openings each in base member 76. The base member 76 is then secured to the support panel 72 utilizing, for example, a pair of nuts. It should be realized that other devices, such as screws or bolts, may be utilized to secure the base member 76 to the support panel 72. In some embodiments, the top member 78 of the shock absorbing mount 74 may interface with alignment structures 86 of the shell assembly 34 that help locate the support panel 72 within the shell assembly 34. In addition, the shock absorbing mounts 74 may be secured to the shell 42 of the shell assembly 34 by fasteners 84 such as bolts and screws.

In certain embodiments, the rear shock absorbing structure may include a thermal interface pad 88 extending between the rear side of the support panel 72 and an inner surface of the shell assembly 34. The thermal interface pad 88 acts as a heat conductor from electronics 70 to shell assembly 34. In addition, the thermal interface pad 88 may act as a shock absorber. The heat conductivity of the thermal interface pad 88 allows the removal of heat constantly generated by the detector panel assembly 46.

FIG. 5, which may be considered along with FIG. 6, is an exploded longitudinal cross-sectional view of the detector panel assembly, illustrating the structure of the detector 22. In certain embodiments, from the front side 36 of the shell 42 that receives radiation 38 to the rear side of the shell 42 the detector panel assembly 46 may include the front shock absorbing structure 52, the detector array 54 that includes the imaging panel 48 and detector panel 50, a backscattered X-ray and reflected light absorption layer 90, the support panel 72, the electronics 70 disposed on the circuit board 82, and the rear shock absorbing structure consisting of the shock absorbing mount 74.

In some embodiments, the support panel 72 may be adhesively joined to the detector array 54. A backscattered X-ray and reflected light absorption layer 90 may be disposed between the detector array 54 and the support panel 72. The reflected light absorption layer 90 may adhesively join the support panel 72 and detector array 54. FIG. 7 illustrates a detail view of the backscattered X-ray and reflected light absorption layer 90 shown in FIG. 6. In some embodiments, the backscattered X-ray and reflected light absorption layer 90 may include an adhesive layer 92, a lead layer 94, and a black layer 96. The adhesive layer 92 may attach the backscattered X-ray and reflected light absorption layer 90 to the support panel 72. The lead layer 94 may prevent reflected light scattering or X-ray backscattering. X-rays may pass through the detector array 54 and reflect back off whatever is found behind the detector array 54 such as the electronics 70 or support panel 72. The reflected X-rays may be detected by the scintillator layer, converted to light, and detected by the photosensitive layer in the detector elements. The lead layer 94 may absorb the X-rays passing through the detector array 54 and any backscattered X-rays. In addition, light scattering may occur. Light scattering occurs when light reflects off the lead back to the detector array 54. To prevent light scattering the backscattered X-ray and reflected light absorption layer 90 may include a black layer 96 configured to absorb reflected light. The black layer 96 may include a coating on the lead layer 94. In some embodiments, the coating may include a black adhesive layer to secure the detector array 54 to the support panel 72. In other embodiments, the coating may include a black paint disposed on the lead layer 94 along with a clear adhesive layer. In another embodiment, the black layer 96 may be disposed on the detector panel 50 and an adhesive layer adheres the detector panel 50 with black layer 96 to the lead layer 94.

Figure 8:
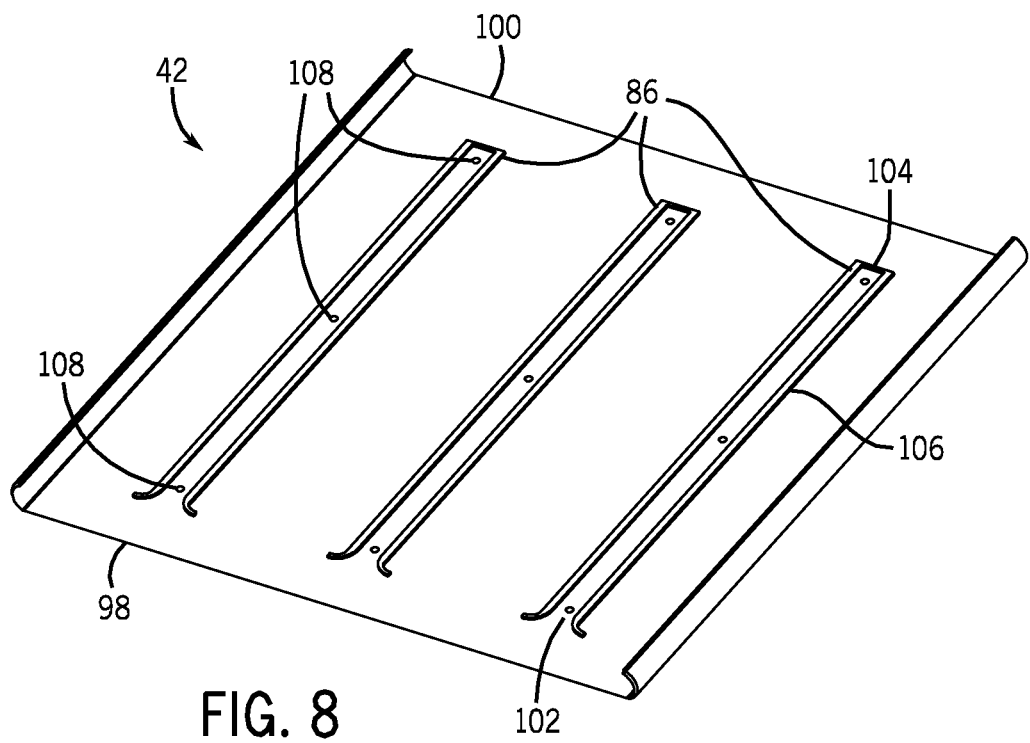
FIG. 8 is an inside view of a back side of a shell of a portable digital X-ray detector in accordance with certain embodiments of the present technique.

FIG. 8 illustrates an inside view of a back side of a shell 42 of a portable digital X-ray detector 22. The shell 42 of a shell assembly 34 may consist of an upper end 98 and a lower end 100. The shell 42 may further include alignment structures 86. In some embodiments, the alignment structures 86 may be molded with the shell 42. Alternatively, the alignment structures 86 may be adhered to the shell 42. The alignment structures 86 may include an open portion 102 located towards the upper end 98 of the shell 42 and a closed portion 104 located towards the lower end 100 of the shell 42. The lengths 106 of the alignment structures 86 run longitudinally from the upper 98 to lower end 100 of the shell 42. Openings 108 disposed through the shell 42 may be located within the alignment structures 86. As previously mentioned above, the top member 78 of the shock absorbing mount 74 may interface with the alignment structures 86 of the shell assembly 34 that help locate the support panel 72 within the shell assembly 34. Upon inserting the detector panel assembly 46 into the shell assembly 34, the alignment structures 86 may guide the top members 78 of the shock absorbing mounts 74 through the open portion 102 and within the alignment structures 86. The detector panel assembly 46 may be inserted until the top members 78 of the foremost shock absorbing mounts 74 interface with the closed portion 104 of the alignment structures 86. In addition, the alignment structures 86 may align the shock absorbing mounts 74 of the shock mount assembly with the openings 108 of the shell 42 disposed within the alignment structures 86. Alignment of the openings 108 may allow for securing the detector panel assembly 46 to the shell assembly 34 via the shock mount assembly. Fasteners may be used to secure the shock absorbing mounts of the shock mount assembly to the shell assembly 34. As shown in FIG. 8, in some embodiments, the shell 42 includes three alignment structures 86. Optionally, more or fewer alignment structures 86 may be necessary depending on the number of shock absorbing mounts 74. Also, the number of openings 108 for shock absorbing mounts 74 may vary.

Figure 9:
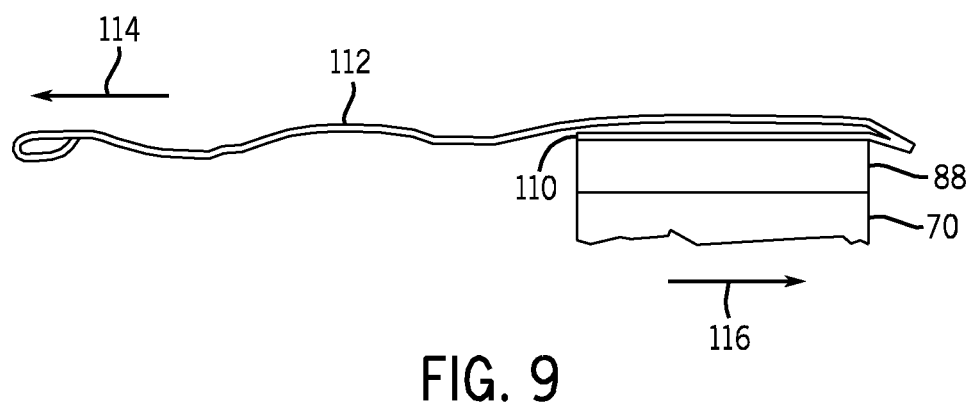
FIG. 9 is a detail view of a thermal gap pad in accordance with certain embodiments of the present technique.

As previously mentioned, the rear shock absorbing structure may include thermal interface pads 88. FIG. 9 illustrates a detail view of a thermal interface pad. The thermal interface pads 88 may be disposed on electronics 70 located on the electronic assembly (circuit board 84, electronics 70, circuitry 66) secured to a rear side of the support panel 72. The thermal interface pads 88 may include a removable friction reducing layer 110. The friction reducing layer 110 may be formed of a polyimide film. The friction reducing layer 110 may ease the insertion of the detector panel assembly 46 into the shell assembly 34. Upon inserting and securing the detector panel assembly 46 into the shell assembly 34 the friction reducing layer 110 may be removed from the thermal interface pad 88. The friction reducing layer 110 may include an extension 112 that allows the friction reducing layer 110 to be removed by pulling the extension 112 in a direction 114 opposite from the direction 116 the detector panel assembly 46 is inserted into the shell assembly 34.

Figure 10:
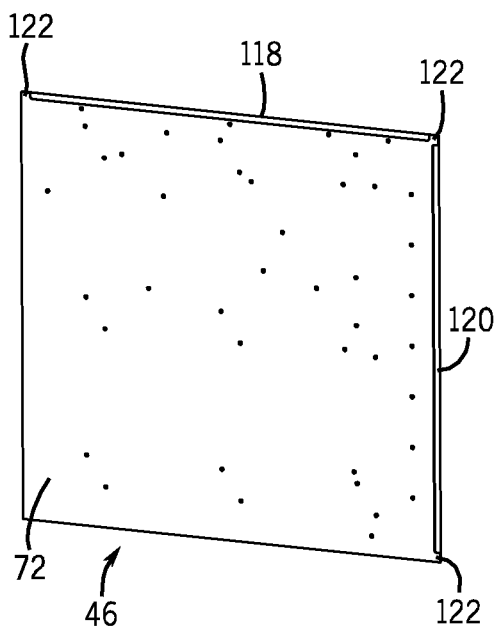
FIG. 10 is an assembled view of a detector panel assembly in accordance with certain embodiments of the present technique.
Figure 11:
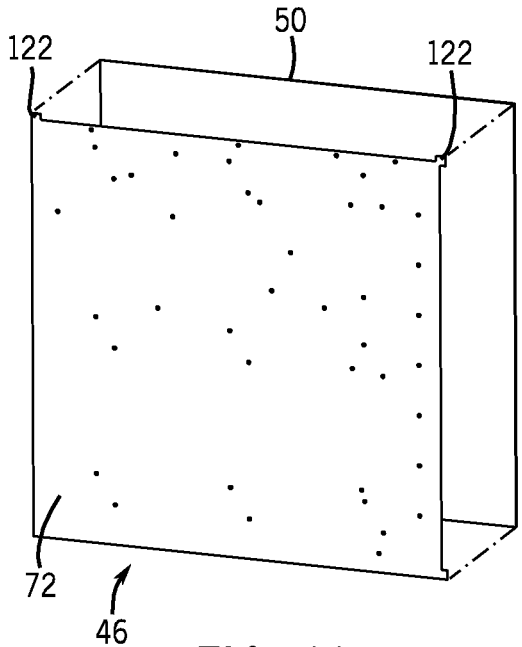
FIG. 11 is an exploded view of the detector panel assembly, as shown in FIG. 10, in accordance with certain embodiments of the present technique.

FIGS. 10-11 respectively illustrate both an assembled and an exploded view of a detector panel assembly 46. In certain embodiments, a front side of a support panel 72 is secured to a rear side of a detector panel 50 of a digital detector array 54. The support panel 72 may be adhesively joined to the detector array 54 via a backscattered X-ray and reflected light absorption layer 90. The backscattered X-ray and reflected light absorption layer 90 may include a lead layer 94 and/or black layer 96 configured to absorb reflected light. At least one side of the support panel 72 may include a recess that exposes an edge region 118 of the detector array 54. The length and depth of the recess may vary. Also, a side of the support panel 72 may include more than one recess. In some embodiments, more than one side of the support panel 72 may include a recess. In one embodiment, shown in FIG. 10, the support panel 72 includes a recess on one side that exposes a first edge region 118 of the detector array 54 and an adjacent recess on another side that exposes a second edge region 120 of the detector array 54. The sides that include a recess need not be adjacent to each other. In some embodiments, the length and/or depth of the first edge region 118 of the detector array 54 may vary from the second edge region 120. Besides recesses, the support panel 72 may include corner extensions 122 to substantially coextensively support all corners of the detector panel 50 of the detector array 54, as shown in FIG. 11, including the corners adjacent to exposed edge regions 118 and 120, as shown in FIG. 10.

Figure 12:
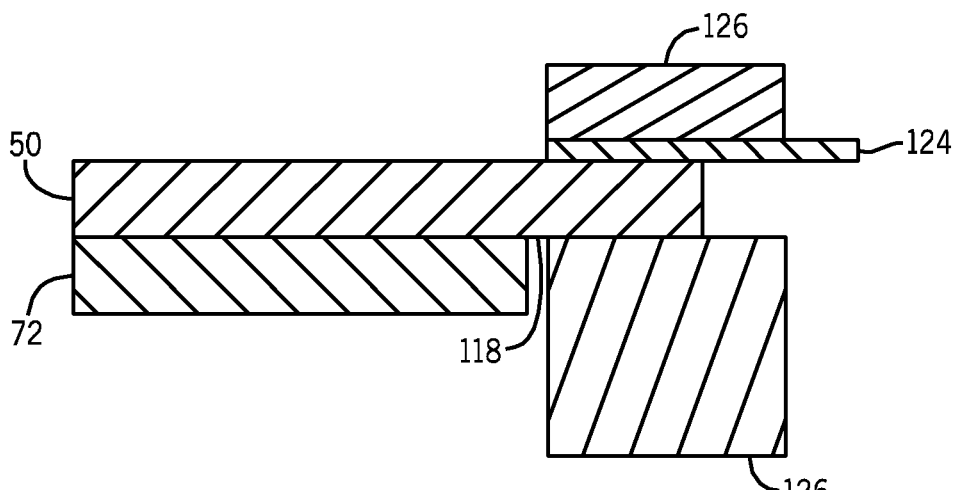
FIG. 12 is diagrammatical side view of the detector panel assembly, as shown in FIG. 10, in accordance with certain embodiments of the present technique.

As illustrated in FIG. 12, a diagrammatical side view of the detector panel assembly shown in FIG. 10, the exposed edge region 118 of the detector array 54 may permit processing of the exposed edge region 118. In some embodiments, processing of the exposed edge region 118 may include bonding conductors 124 to the exposed edge region 118 of the detector array 54. For example, the exposed edge region 118 of the detector array 54 may be inserted into a bonding device that bonds conductors 124 onto to the exposed edge region 118. The conductors 124 may be flexible. FIG. 12 shows an embodiment where bonder 126 secures the connector 124 to the detector panel 50 of the detector array 54. As shown in FIG. 12, a portion of the exposed edge region 118 may remain exposed. This remaining exposed portion may allow for the removal and re-securing of the same or another conductor 124 to the exposed edge region 118 of the detector array 54 without removing the support panel 72 from the detector array 54. The depth of the placement of the conductor 124 within the exposed edge region 118 may vary, thus varying the portion of the exposed edge region 118 that remains exposed.

In certain embodiments, the processing of the exposed edge region 118 may couple the digital detector array 54 to electronics 70 disposed on a rear side of the support panel 72. The conductors 124 bonded onto the exposed edge region 118 may allow for interface between electronic modules and the digital detector array 54. The electronic modules could include data modules 66 and/or scan modules 68. In other embodiments, the processing of the exposed edge region 118 may allow for electrically coupling the exposed edge regions 118 to conductors 124 for communication of imaging data from the detector array 54.

In accordance with a method of one embodiment, the digital X-ray detector 22 described above may be assembled. The method may include assembling a detector panel assembly 46 that includes securing an electronic assembly to a rear side of a support panel 72, coupling a shock mount assembly to the rear side of the support panel 72, adhering a reflected light absorption layer 90 to a front side of the support panel 72, adhering a detector array 54 to a front side of the reflected light absorption layer 90, and adhering a front shock absorbing structure 52 to a front side of the detector array 54. The method may further include inserting the detector panel assembly 46 into a shell assembly 34, wherein the shell assembly 34 surrounds the detector panel assembly 46. Also, the method may include securing the detector panel assembly 46 to the shell assembly 34 via the shock mount assembly. In some embodiments, the method includes disposing thermal interface pads 88 layered with a removable friction reducing layer 110 on a rear side of the electronic assembly and removing the friction reducing layer 110 from the thermal interface pads 88 upon inserting and securing the detector panel assembly 46 into the shell assembly 34.

In accordance with a method of another embodiment, the digital X-ray detector panel assembly 46 described above may be assembled. The method may include securing a rear side of a detector array 54 to a front side of a support panel 72 that includes a recess in at least one side of the support panel 72, wherein the recess of the support panel 72 exposes an edge region 118 of the detector array 54. The method may further include processing the exposed edge region 118 of the detector array 54.

In accordance with a method of a further embodiment, the digital X-ray detector panel assembly 46 described above may be assembled and serviced. The method may include assembling a detector panel assembly 46 that includes a digital detector array 54; a support panel 72 with a front side secured to a rear side of the detector array 54, wherein at least one side of the support panel 72 includes a recess exposing an edge region 118 of the detector array 54, and an electronic module interfaced with the digital detector array 54 via conductors 124 secured to the exposed edge region 118 of the detector array 54. The method may further include removing at least one of the conductors 124 from the exposed edge region 118 of the detector array 54 without removing the support panel 72 from the detector array 54 and re-securing the same or another conductor 124 to the exposed edge region 118 of the detector array 54 without removing the support panel 72 from the detector array 54. In some embodiments, the method may include inserting the exposed edge region 118 of the detector array 54 into a bonding device and bonding the conductors 124 to the exposed edge region 118 of the detector array 54.

The X-ray detector 22 described in various embodiments discussed above is lightweight yet mechanically stiff and rugged and has improved energy absorption capability. The structural load bearing components (the shell assembly 34 and the support panel 72) of the X-ray detector 22 are made up of a composite material. The composite material offers high mechanical rigidity and strength while simultaneously making construction lightweight. The low density of the composite material used helps reduce the weight while the high modulus and strength of the carbon fiber composite helps to make the construction rigid and strong.

The sleeve design (open on at least one end for insertion of detector panel assembly 46) of the shell assembly 34 provides mechanical ruggedness since fasteners are no longer required to hold the faces and sides of the external enclosure together. Additionally, the design allows for the fabrication with either composites or plastics and therefore reduces weight and improves mechanical toughness.

Further, the new packaging design for the X-ray detector 22, described in various embodiments discussed above, isolates the fragile detector panel assembly 46 (detector array 54 and readout electronics) from the external shell assembly 34 by employing both a front shock absorbing structure 52 (e.g., foam) and a rear shock absorbing structure (e.g., shock absorbing mounts 74). Isolating the detector panel assembly 46 from the external shell assembly 34 protects the detector panel assembly 46 from external shock and stresses occurring as a result of being dropped or banged against hard objects accidentally.

Features of the new packaging design provide for ease of assembly of the X-ray detector 22. The alignment structures 86 guide the shock absorbing mounts 74 when inserting the detector panel assembly 46 into the shell assembly 34 and also align the shock absorbing mounts 74 to help in securing the detector panel assembly 46 to the shell assembly 34. The friction reducing layers on both the front shock absorbing structure 52 and thermal interface pads 88 ease the insertion of the detector panel assembly 46 into the shell assembly allowing for a tight fit assembly of the detector 22 that reduces the overall thickness of the detector 22. Adhering the detector array 54 and backscattered X-ray and reflected light absorption layer 90 to the support panel 72 reduces assembly time while increasing structural support to the support panel 72.

Additionally, the overall packaging design provides for maintenance and servicing of the X-ray detector 22. The sleeve design of the shell assembly 34 eases the cleaning of the detector 22. The design of the detector panel assembly 46 where the support panel 72 includes one or more sides with recesses that expose edge regions 118 of the detector array 54 allows for easier processing of the edge regions 118. The exposed edge regions 118 of the detector array 54 allow connectors 124 disposed on the exposed edge regions 118 to couple the electronics 70 on one side of the support panel 72 to the digital detector array 54 located on the other side of the support panel 72. In addition, the exposed edge regions 118 provide space to allow the removal and the re-securing of connectors 124 to the exposed edge regions 118 of the detector array 54 without having to remove the support panel 72 from the detector array 54. Also, the support panel 72 includes corner extensions 122 to provide support to the corners of the fragile detector array 54 even those corners near the exposed edges 118 of the detector array 54. These features of the support panel 72, the recesses and the corner extensions 122, avoid the potential breaking of the detector array 54 and save time and money in the assembly of the digital X-ray detector 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for assembling a digital X-ray detector assembly, comprising:
   securing a rear side of a detector array to a front side of a support panel that includes a recess in at least one side of the support panel, wherein the recess of the support panel exposes an edge region of the detector array, and wherein the support panel includes corner extensions to substantially coextensively support all corners of the detector array, including corners adjacent to the exposed edge region, wherein a pair of the corner extensions flanks the recess; and
   processing the exposed edge region of the detector array.

2. The method of claim 1, wherein processing the exposed edge region of the detector array includes coupling the detector array to electronics disposed on a rear side of the support panel.

3. The method of claim 1, wherein processing the exposed edge region of the detector array includes bonding conductors for electronic modules on to the exposed edge region of the detector array.

4. The method of claim 3, wherein the electronic modules include data modules.

5. The method of claim 3, wherein the electronic modules include scan interface modules.

6. The method of claim 1, wherein processing the exposed edge region of the detector array includes electrically coupling the exposed edge region to conductors for communication of imaging data from the detector array.

7. The method of claim 1, wherein securing a rear side of a detector array to a front side of the support panel includes adhering the detector array to the support panel.

8. The method of claim 7, wherein the detector array is adhered to the support panel via a backscattered x-ray and reflected light absorption layer.

9. The method of claim 8, wherein the backscattered x-ray and reflected light absorption layer includes a lead layer and a black layer configured to absorb backscattered x-rays and reflected light, respectively.

10. The method of claim 1, wherein two or more sides of the support panel each includes a respective recess.

11. A digital X-ray detector assembly made by the method of claim 1.

12. The detector assembly of claim 11, wherein two or more sides of the support panel each includes a respective recess exposing a respective edge region of the detector array.

13. The detector assembly of claim 11, wherein the support panel is adhesively joined to the detector array via a backscattered x-ray and reflected light absorption layer.

14. The detector assembly of claim 13, wherein the backscattered x-ray and reflected light absorption layer includes a lead layer and a black layer configured to absorb backscattered x-rays and reflected light, respectively.

15. A method for assembly and servicing of a digital X-ray detector assembly, comprising:
   assembling a detector assembly comprising:
      a digital detector array;
      a support panel with a front side secured to a rear side of the detector array, wherein at least one side of the support panel includes a recess exposing an edge region of the detector array, and wherein the support panel includes corner extensions to substantially coextensively support all corners of the detector array, including corners adjacent to the exposed edge region, wherein a pair of the corner extensions flanks the recess; and
      an electronic module interfaced with the digital detector array via conductors secured to the exposed edge region of the detector array;
   removing at least one of the conductors from the exposed edge region of the detector array without removing the support panel from the detector array; and
   re-securing the same or another conductor to the exposed edge region of the detector array without removing the support panel from the detector array.

16. The method of claim 15, comprising:
   inserting the exposed edge region of the detector array into a bonding device; and
   bonding the conductors to the exposed edge region of the detector array.

17. The method of claim 16, wherein the front side of the support panel is adhesively secured to a rear side of the detector array.

* * * * *